United States Patent [19]

Simelunas et al.

[11] Patent Number: 5,010,838
[45] Date of Patent: Apr. 30, 1991

[54] APPARATUS FOR CONTINUOUS PAN COATING

[75] Inventors: William Simelunas, Glen Rock, N.J.; Joseph T. Deloy, Lyndhurst, N.Y.

[73] Assignee: Nabisco Brands, Inc., East Hanover, N.J.

[21] Appl. No.: 753,738

[22] Filed: Jul. 10, 1985

[51] Int. Cl.$^5$ .............................................. A23G 3/26
[52] U.S. Cl. .................................... 118/19; 118/20; 118/303
[58] Field of Search ........................ 118/19, 20, 303

[56] References Cited

U.S. PATENT DOCUMENTS

| | | |
|---|---|---|
| 2,451,096 | 10/1948 | Kooman . |
| 2,726,959 | 12/1955 | Lushbough et al. . |
| 2,970,563 | 2/1961 | Hunter ................................ 118/19 |
| 3,063,843 | 11/1962 | Hashimoto . |
| 3,381,658 | 5/1968 | Porambo ........................... 118/19 |
| 3,390,648 | 7/1968 | Martin ............................... 107/54 |
| 3,394,677 | 7/1968 | Taylor et al. ...................... 118/16 |
| 3,448,718 | 6/1969 | Green et al. ................... 118/19 X |
| 3,451,375 | 6/1969 | Martin ............................... 118/19 |
| 3,469,561 | 9/1969 | Gordon ............................. 118/16 |
| 3,557,718 | 1/1971 | Chivers ............................. 107/54 |
| 3,561,981 | 2/1971 | Roe .................................... 99/166 |
| 3,875,894 | 4/1975 | Steinberg et al. ................ 118/19 |
| 3,911,860 | 10/1975 | Nohynek ...................... 118/19 X |
| 4,079,151 | 3/1978 | Schade et al. ..................... 426/96 |
| 4,168,674 | 9/1979 | Futter ................................ 118/695 |
| 4,245,580 | 1/1981 | Okawara ........................... 118/19 |
| 4,283,012 | 8/1981 | Hanson ............................ 239/118 |
| 4,334,493 | 6/1982 | Okawara ........................... 118/19 |
| 4,422,574 | 12/1983 | Mancuso, Jr. ................... 239/118 |
| 4,430,003 | 2/1984 | Beattle et al. ................ 118/303 X |
| 4,465,017 | 8/1984 | Simmons ...................... 118/19 X |
| 4,478,171 | 10/1984 | Bridges et al. ............... 118/303 X |

FOREIGN PATENT DOCUMENTS

| | | |
|---|---|---|
| 22328 | 11/1968 | Australia . |
| 870894 | 1/1942 | France . |
| 1412273 | 4/1965 | France ................................ 118/303 |
| 2053554 | 4/1971 | France . |
| 2228437 | 12/1974 | France . |

Primary Examiner—Shrive Beck
Assistant Examiner—Alain Bashore

[57] ABSTRACT

An apparatus useful for continuous pan coating of edible cores which includes a coating drum arranged for rotation around an inclined axis and having an inlet opening at the upper axial end of the coating drum for reception of the edible cores, and a discharge opening at the lower axial end of the drum, so that the force of gravity urges the cores through the drum. The apparatus also includes a means for continuously driving the drum, means for providing coating material to the cores at a controllable rate, and means for delivering drying gas, such as air, to the cores also at a controllable rate while the cores are in the drum. The present invention has at least one after-treatment drum likewise arranged for rotation around an inclined axis and having an inlet opening at the upper axial end of the after-treatment drum and a discharge opening at the lower axial end, as well as a means for continuously driving the cores from the coating drum to the first after-treatment drum. In a preferred embodiment, the apparatus also includes a second after-treatment drum similar to the first after-treatment drum.

15 Claims, 9 Drawing Sheets

FIG.10

APPARATUS FOR CONTINUOUS PAN COATING

BACKGROUND OF THE INVENTION

The present invention relates to the art of coating edible cores, and, in particular, to a method and apparatus for continuous pan coating edible cores.

The practice of applying a coating to edible particulate matter one cores by pan of coating generally includes placing the cores in a rotating drum which continuously agitates them while a solution of the coating material is applied, usually by spraying the material over the cores in the rotating drum during agitation. It is customary to coat edible cores such as nuts, chewing gum, candies, fruits, lozenges, dragees, and medicinal tablets with one or more layers of candy or sugar coating by conventional procedures using a drum or a rotatable vessel and warm air or other drying gas to evaporate and/or harden each layer in preparation for application of subsequent layers.

For example, U.S. Pat. No. 4,334,493 to Okawara shows a rotary drum type apparatus for applying a coating to tablets which includes a rotary drum supported by a frame for receiving a body of tablets to be coated by spraying with a solvent. The drum which can be inclined through about 10-20° in such a manner that its front surface is turned upwardly, includes a device which supplies a coating material into the interior of the drum and an inlet tube and an outlet tube to provide a supply of drying gas such as air to the interior. The support frame cooperates with an outer periphery of the drum to define an air suction duct disposed on the front side of the support frame and an air exhaust duct disposed on the rear side of the support frame so that a smooth flow of hot blast through the drum can be obtained.

Similarly, in U.S. Pat. No. 4,245,580 to Okawara, a device for coating granular solids is disclosed which has a double-cone rotary drum perforated so as to permit flow of air or gas into and out of the rotary drum, and which is tiltable about the axis at right angles to the axis of rotation of the rotary drum so that in the case of the discharge of product solids, the opening of the rotary drum may be directed downwardly. Axial annular insulating covers are providing which insure the effective thermal insulation of the rotary drum when the hot air or gas is blown thereinto. However, each of the Okawara disclosures discussed above relate to coating drums for batch operation since each body of cores to be coated must be fed into and discharged from a single opening. Similar operation and apparatus are shown in U.S. Pat. No. 3,448,718; U.S. Pat. No. 3,063,843; and U.S. Pat. No. 2,726,959.

U.S. Pat. No. 3,911,860 to Nohynek discloses a coating drum for continuous coating of dragees with a coating material and for subsequent application and glossing of a protective skin over the coating by use of a co-axially connected after-treatment drum. In particular, both drums are fixed in a sealing connection to each other and may be driven at different speeds by means of a variable speed transmission rotationally interconnected. The dragee drum shown by Nohynek is a double frustum, while the after-treatment drum is cylindrical. Both drums are equipped with conveying baffles in order to push the product through from the entrance to the exit. On the inner wall of the rear frustum of the dragee drum are located conveying baffles 5 arranged in relation to the direction of rotation so that only a few dragees at a time are discharged through rear discharge opening 6. The discharge opening 6 leads to an inner drum 7 of approximately the same diameter through which the coated particles flow by means of conveying baffles 11 to radial transfer opening 17 into intermediate drum 10 on which there are also located helical screw type conveying baffles 5 and 13. The particles pass from intermediate drum 10 into the outer drum space 20 from which they emerge through discharge openings 21.

In each of these disclosures, as well as general practice in the art, there is lacking a method and apparatus for continuous pan coating of edible cores in which there is a high degree of control of the coating process.

Accordingly, it is an object of the present invention to overcome problems normally associated with the continuous highly controlled pan coating of edible particulate matter or cores.

It is another object of the present invention to provide an apparatus for continuous pan coating of edible cores with several layers of coating material.

It is a further object of the present invention to provide an apparatus whereby edible cores can be provided with a chocolate candy coating, as well as successive protective outer coatings over the chocolate coating.

SUMMARY OF THE INVENTION

In accordance with the present invention, an apparatus is provided which is useful for continuous pan coating of edible cores which includes, in combination, a coating drum arranged for rotation around an inclined axis and having an inlet opening at the upper axial end of the coating drum for reception of edible cores and a discharge opening at the lower axial end of the coating drum, and preferably means for controlling the incline of the drum to vary the degree of force exerted by gravity urging the cores through the drum during the panning operation. There is further included a means for continuously driving the coating drum, means for delivering coating material to the cores at a controllable rate, and means for delivering drying gas to the cores at a controllable rate while the cores are in the coating drum.

Also included in the present apparatus is at least one after-treatment drum likewise arranged for rotation around an inclined axis and having an inlet opening at the upper axial end of the after-treatment drum for the reception of coated cores from the coating drum, and a discharge opening at the lower axial end for the discharge of treated coated cores. Also, a means for continuously driving said at least one after-treatment drum is provided, as well as a means for continuously conveying the coated cores from the discharge end of the coating drum to the inlet opening of the after-treatment drum. Finally, a means is provided for applying the after-treatment coating at a controllable rate to the coated cores during passage of the cores through the after-treatment drum.

In a preferred embodiment of the present invention, there is further provided a second after-treatment drum arranged for rotation as in the at least one after-treatment drum and also having features or characteristics similar to those of the after-treatment drum, such as a means for continuously driving the second after-treatment drum, means for continuously conveying the cores from the discharge of the first after-treatment drum to the second after-treatment drum, as well as means for applying a second after-treatment coating to the after treated coated cores.

In order to provide a means for controlled delivery of the coating in the coating drum, the present invention includes in one embodiment a coating manifold extending lengthwise in the interior of the coating drum with adjustable coating nozzles, preferably four in number, arranged along the length thereof for controlling the amount of coating material delivered to the cores. The means for delivering the coating also includes a control means for selectively adjusting each of the nozzles from a location exterior of the coating drum. The coating manifold preferably includes a continuous conduit connected for fluid communication with a source of coating material and with each of said adjustable nozzles whereby fluid coating material is provided to the nozzles.

Adjustable nozzles for use in the present invention can include a nozzle housing having a coating supply bore with an exit port, a movable means for restricting the fluid flow through the exit port which is responsive to means for adjusting the flow restriction means. The adjustment means is preferably fixed to the nozzle housing at a location exterior thereto and operable to adjust the flow restriction means. The movable means for restricting flow can be a pin element slidably mounted in the bore and connected to the adjusting means for linear movement through the bore.

In a preferred embodiment of the invention, the control means include nozzle adjustment stations mounted interiorly of the coating drum at positions adjacent to nozzles along the coating manifold, a rod member secured for rotation adjacent the coating manifold and parallel thereto, the rod member having fixed thereon rotating adjustors at positions on the rod member wherein each rotating adjustor can be selectively engaged with, and disengaged from, a nozzle adjustment station by linear movement of the rod member. This embodiment also contemplates use of a means for varying the position of the rod member linearly with respect to the coating manifold, as well as means for rotating the rod member which is fixed on the end of the rod member at a position exterior to the coating drum.

A nozzle adjustment station which can be used with the above-described apparatus includes means for securing the rod member for rotation, an interconnecting drive means fixed to the means for securing the rod member which drives the manifold nozzle adjustment means in response to rotation of a rotating adjustor engaged therewith. The interconnecting drive means can include a drive rod with a first end adjacent to the nozzle adjustment means with a first driving gear means fixed thereon for driving the nozzle adjustment means, and a second end with a second driving gear means fixed thereon proximal to the rotating adjustor which can be selectively engaged with the rotating adjustor by linear displacement of the control rod. Thus, the interconnecting drive means and the nozzle adjustment means can be driven upon rotation of the control rod while the rotating adjustor and the second gear means are engaged.

To provide a means for varying the linear position of the rod member, a linear-shift housing can be mounted at the end of the rod member exterior to the coating drum through which the rod member extends, and a linear rod control sleeve fixed around the rod at the position on such rod which extends through the housing. The control sleeve has adjusting elements formed thereon which coact with the linear-shift housing to hold the rod member in position whereby each of the rotating adjustors can selectively be engaged with a second gear means at each adjustment station.

Further in accordance with the present apparatus, there is provided a means for delivering drying gas at a controllable rate which includes a drying gas manifold mounted interiorly along the length of the coating drum which has adjustable gas delivery ports provided along the length thereof, preferably four each, and means for controlling the flow of drying gas through the gas delivery ports from a location exterior of the coating drum. Preferably, each of the drying gas delivery ports includes an exit orifice having a baffle mounted therein for rotation across the orifice, while the means for controlling the flow of the drying gas includes linking means extending from a control handle exterior of the coating drum to each of the baffles for rotating such baffle so that gas flow through the respective exit orifice is controlled.

As a result of the present invention, a highly controlled apparatus and method for continuously applying a candy coating, especially chocolate, is provided in which subsequent protective and appearance-improving coats can be applied on a continuous basis without interruption of flow of edible particulate matter or cores.

For a better understanding of the present invention, together with other and further objects, reference is made to the following description, taken in conjunction with the accompanying drawings, and its scope will be pointed out in the appended claims.

BRIEF DESCRIPTION OF THE DRAWINGS

Preferred embodiments of the invention have been chosen for purposes of illustration and description and are shown in the accompanying drawings wherein:

FIG. 6a is a cross-section of the coating material delivery manifold taken along lines 6a—6a;

DETAILED DESCRIPTION OF THE INVENTION

Each of the drawings depicts so much of that part of the particular embodiment of the invention which is required to provide an adequate understanding thereof. The surrounding or connected portions of the apparatus which are not shown or detailed in each drawing are understood as being part of the state of the art or are depicted in accompanying related drawings.

Figure 1:
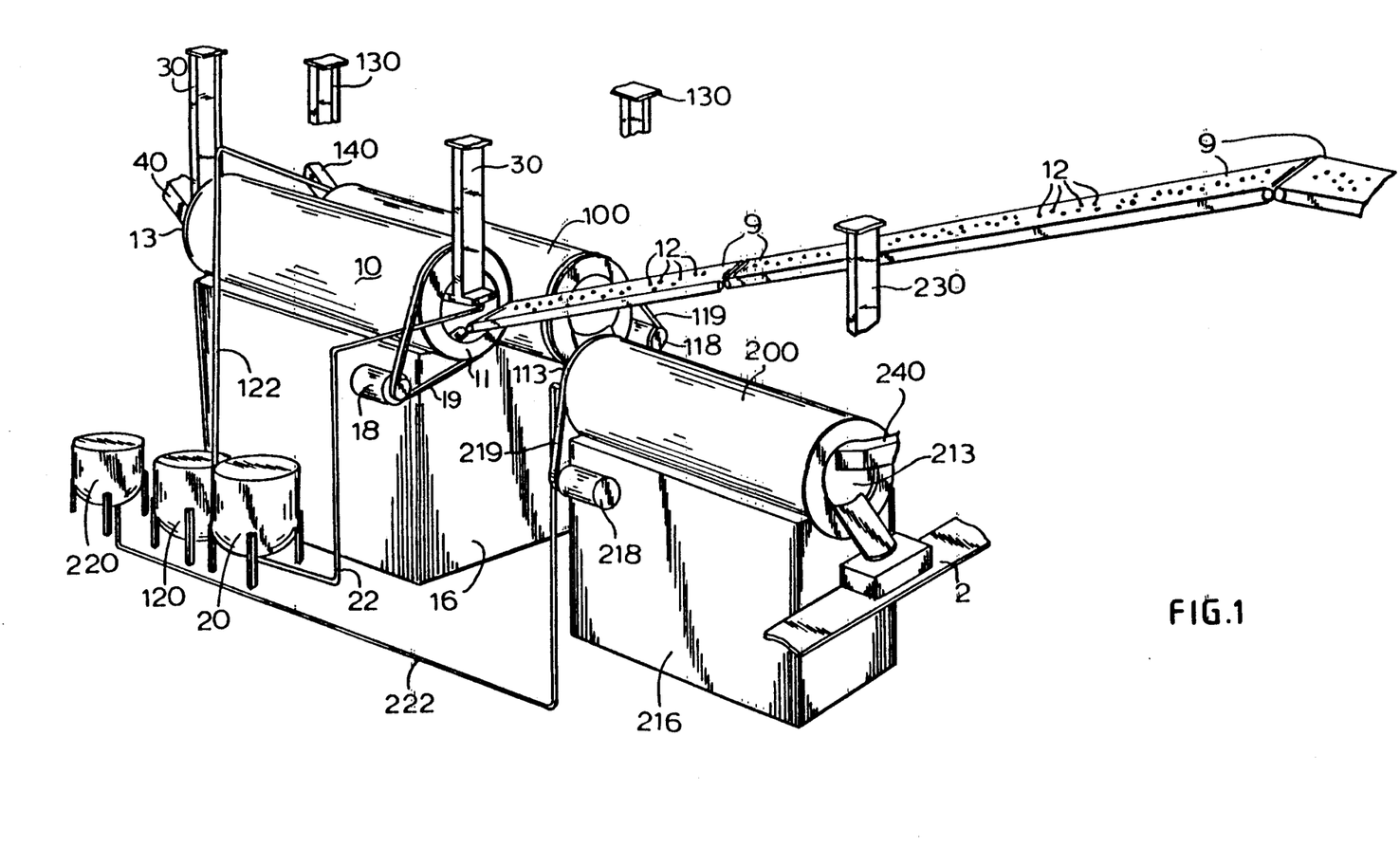
FIG. 1 is a perspective view of an overall system for continuous pan coating in accordance with the present invention.
Figure 2:
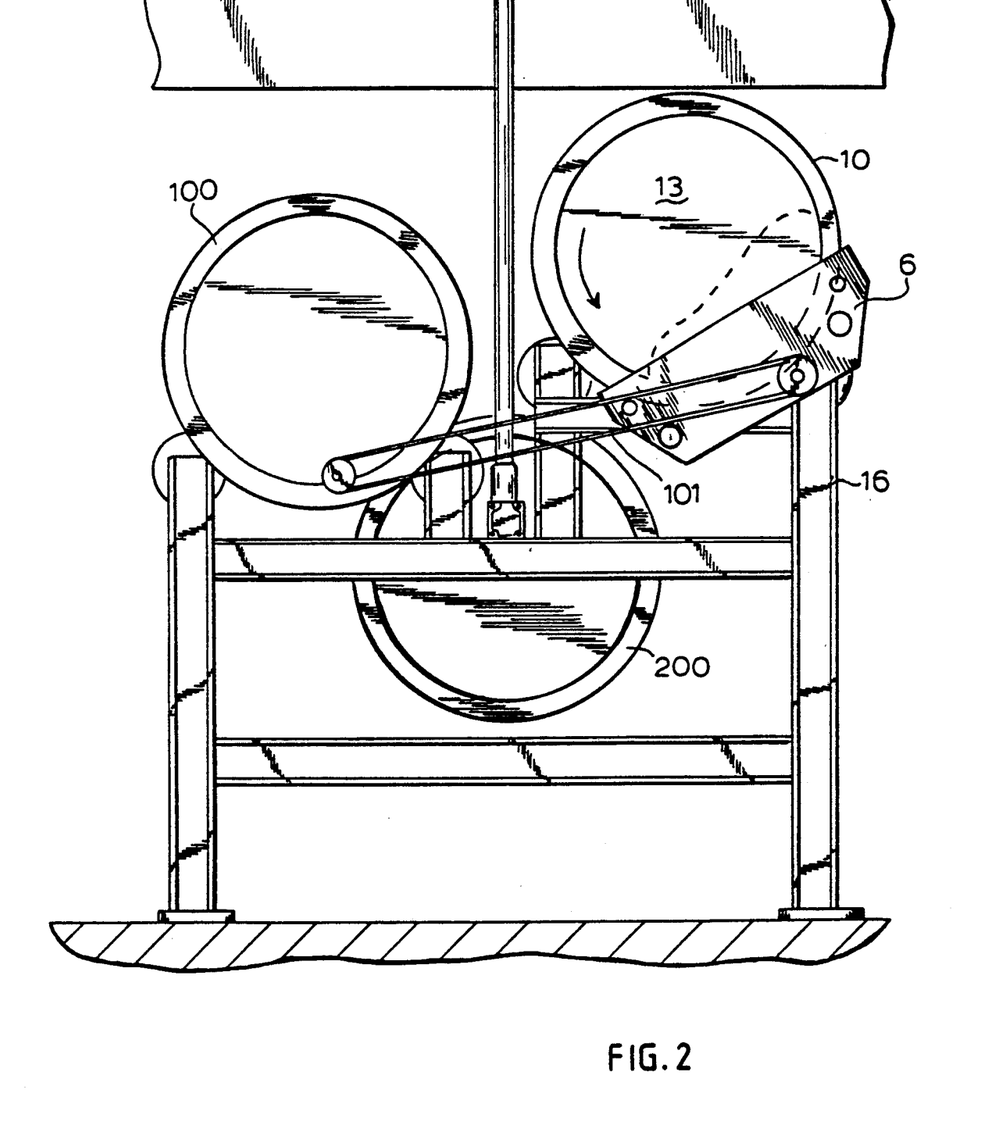
FIG. 2 is an elevated end view of the combined apparatus taken from the left hand side of FIG. 1.
Figure 3:
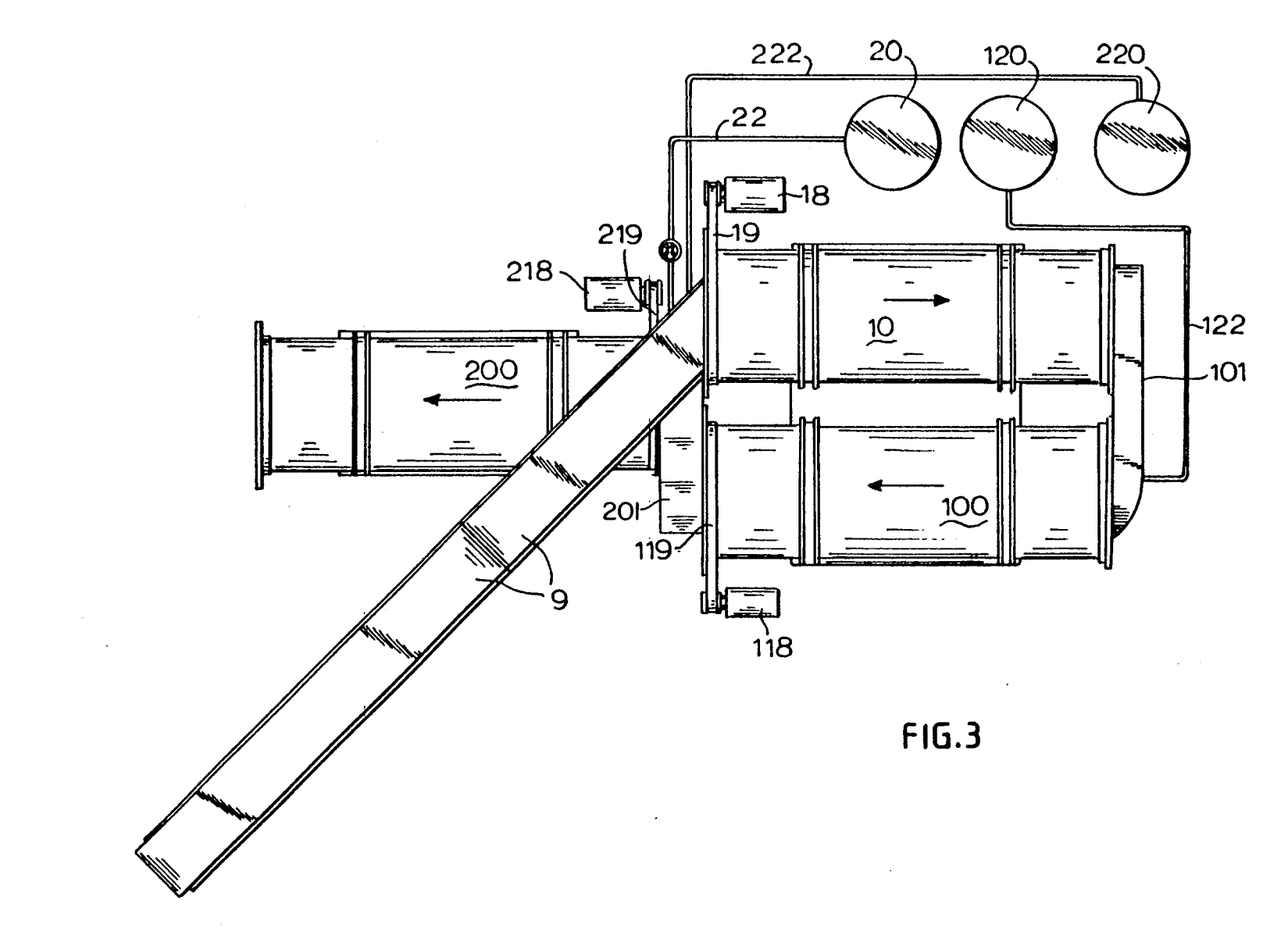
FIG. 3 is a plan view of the combined apparatus of a preferred embodiment of the present invention.

Referring to FIGS. 1, 2 and 3, there is shown a combined apparatus in accordance with a preferred embodiment of the present invention in which a coating drum 10 is shown in series with a first after-treatment drum 100 and a second after-treatment drum 200. Particulate core material 12 is delivered from a source via conveyor means 9 into receiving end 11 of the coating drum 10. The coating drum 10 is mounted on a support 16 at an incline which is pitched downwardly from receiving end 11 towards discharge end 13. The angle or pitch of the drum, as well as the speed of rotation of the drum, provided by continuously moving drive belt or chain 19 and drive motor 18, can be varied by conventional means. The angle of the drum and the rate is generally determined by the amount of coating and the rate of product feed. Furthermore, as seen in FIG. 2, product volume control is also effected by use of a product retainer plate 6, which can be affixed to the exit end 13 of drum 10.

Figure 5:
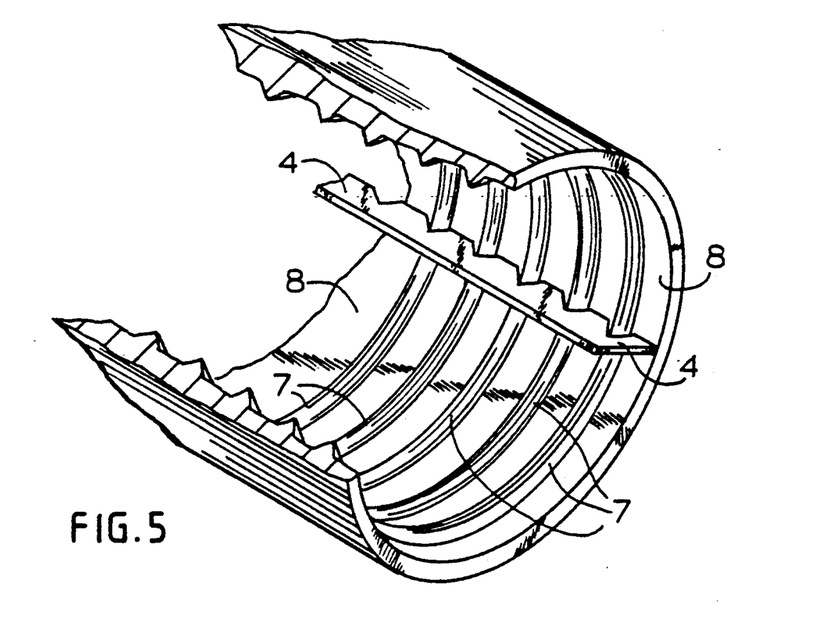
FIG. 5 depicts a portion of the inside of a coating drum which includes a coating material recovery feature of the present invention.

Gravity flow, along with drum rotation, are the primary means by which the product flows through the present continuous pan coating system. Conventional conveying means, such as endless belts, can also be used between coating drums if the drums are not located one below the other. In a preferred mode of operation, a scraping and scrap removal means is also provided in the coating drum 10 to insure continual tumbling of the particulate matter being coated as well as to avoid coating build-up which requires production shut-down for clean-up. In FIG. 5 there is shown a portion of a drum interior which has a drum wall 8 having ribs 7 which effect forward travel of particles as they tumble during drum rotation. In order to prevent coating material build-up as well as particle back-flow against the particulate mass, a notched scraper 4 can be mounted along the length of the drum over several of the ribs 7 at a point which does not interfere with the coating process. These problems are associated with continuous coating processes, and are not incurred in batch operations wherein alternate or supplemental equipment usage avoids coating build-up, etc.

As shown in FIG. 2, each of the drums can be mounted at a position lower than the drum before it, i.e., the treatment drum 100 is slightly below coating drum 10, and is mounted higher than second after-treatment drum 200. Each of the drums has its own source of continuous rotation, shown as motor 118 and continuous belt 119 in the case of after-treatment drum 100, and as motor 218 and continuous belt 219 for the second after-treatment drum 200. The direction of flow of particulate matter is shown in FIG. 3 as originating from conveyor belt means 9 through drum 10, and thence into drum 100 via conveyor 101. The particulate mass is passed through drum 100 where it is further coated or treated and then moved to the receiving end 113 of drum 200 via conveyor 201 and then through drum 200 to its discharge end 213. The drum 200 is mounted on a support 216 as depicted in FIG. 1.

Referring specifically to FIGS. 1 and 3, a source of coating material is shown for each of the drums. Vessel 20 provides the coating material for the coating drum 10 via line 22; vessel 120 provides a source of after-treatment material via line 122, while vessel 220 is a source of material, such as a final coating, for second after-treatment drum 200 and is provided by means of supply line 222. There is also shown in FIG. 1 an overhead support means for the separate delivery systems for each of the drums. In the case of the coating drum 10, there are shown overhead support member 30 which also support scrap removal as well as the delivery system; in the case of drum 100, there are shown overhead support members 130; while for drum 200, overhead support member 230 is shown. Finally, with reference to FIG. 1, drying-gas delivery conduits 40, 140 and 240 are shown for each of the drums, as well as final product receiving conveyor means 2.

Figure 4:
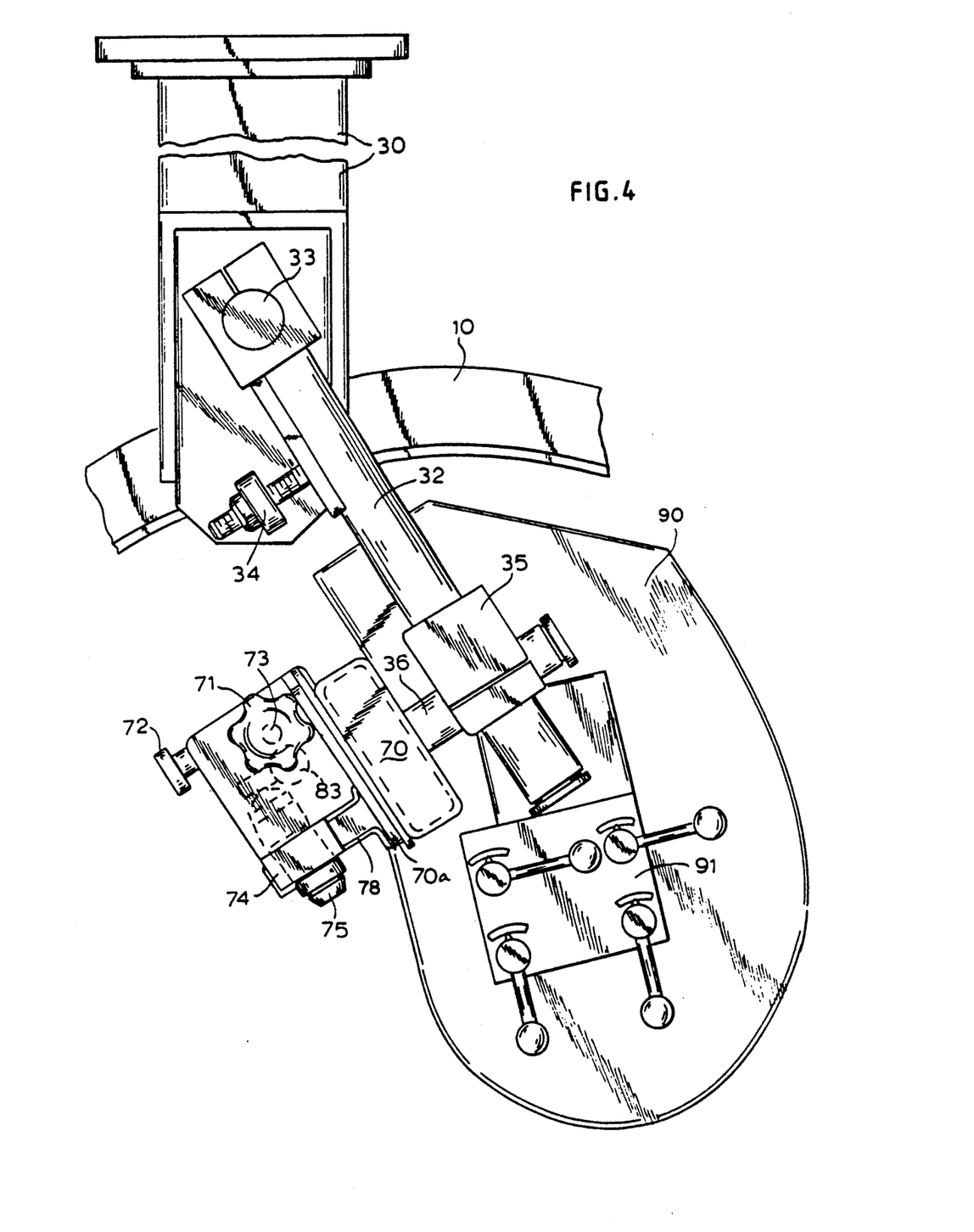
FIG. 4 shows control apparatus mounted for operation at the discharge end of the coating drum as depicted in FIG. 1.

FIG. 4 shows a support member 30 and the delivery control system from the discharge end 13 of coating drum 10. The control system is mounted on support member 30 by means of an angle/elevation rod 32 attached for rotation to support beam 33. As shown in FIG. 4, the rod 32 can be elevated or depressed in an angular direction by means of angle adjustment 34, while the position of the delivery control system along the length of rod 32 can be varied by means of clamping adjustment sleeve 35. Coating-supply adjustment rod 36 which can be moved longitudinally along its length and clamped to secure the coating supply system support 70, 70a at the desired position. Basically, the coating supply system should be adjusted to a position at which the coating spray is directed to the middle of the particle mass in the drum.

Referring to FIGS. 4-8 inclusively there is shown the coating distribution system of the present invention which includes primarily a coating material distribution manifold 74 in combination with a control mechanism, the primary component of which is control rod 73. The coating manifold 74 is connected for fluid communication with a source of coating material and also with each of the controllable coating nozzles 75, preferably four in number. The coating manifold 74 can be constructed such that temperature control can be maintained by means of adjacent conduits 74c through which a medium, such as warm water, can be continuously passed (See FIG. 6a). Thus, a coating material such as chocolate can be continuously fed through manifold feed conduit 74b without incurring blockage due to freeze-up.

Figure 6:
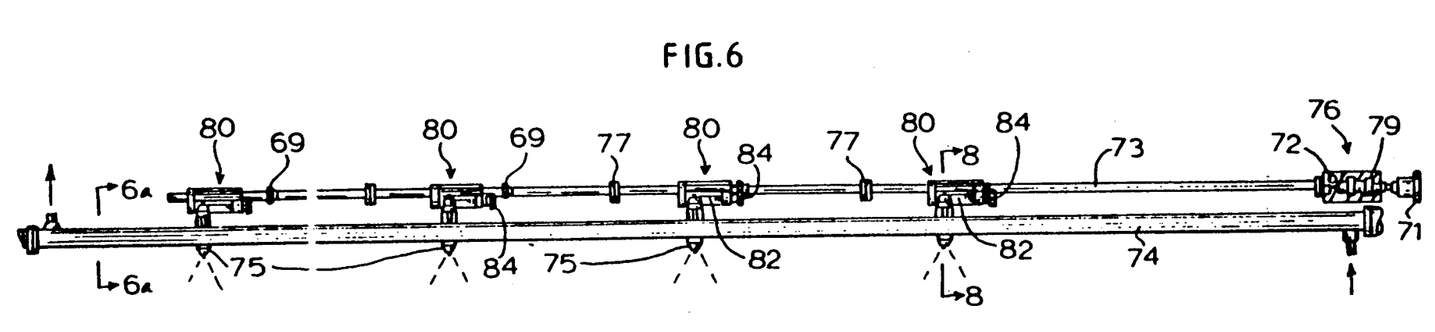
FIG. 6 shows a controlled coating delivery system according to the embodiment of the present invention depicted in FIG. 4.
Figure 6A:
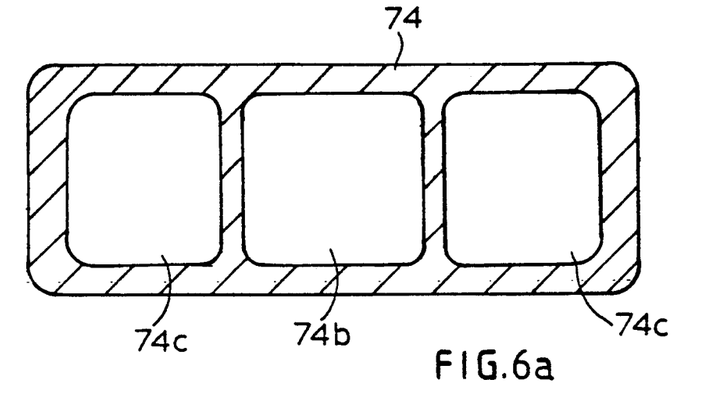
Figure 7:
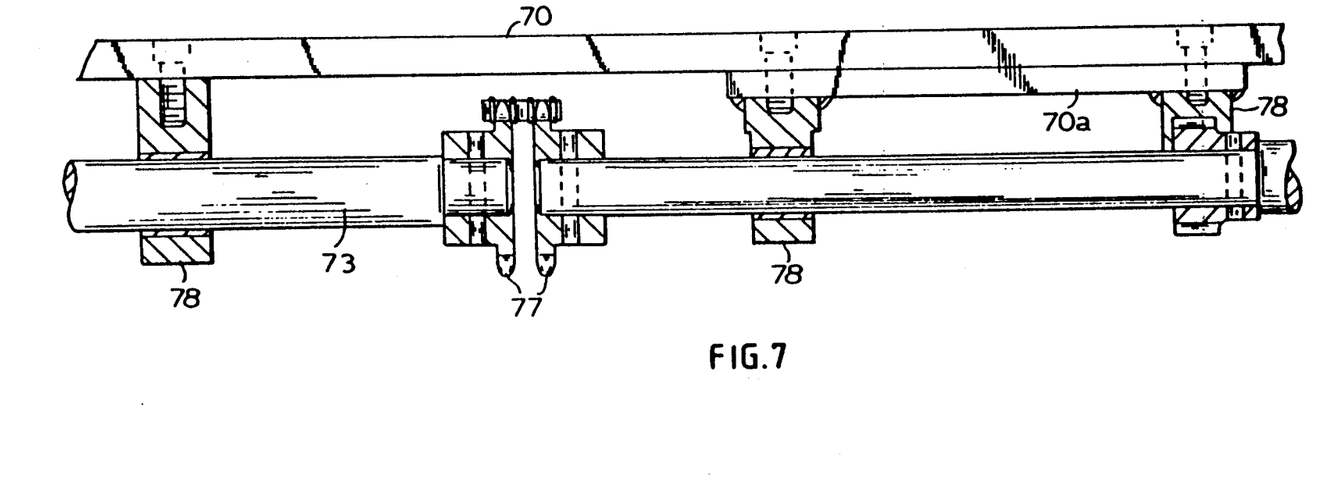
FIG. 7 is an enlarged view of a portion of the control system shown in FIG. 6.
Figure 8:
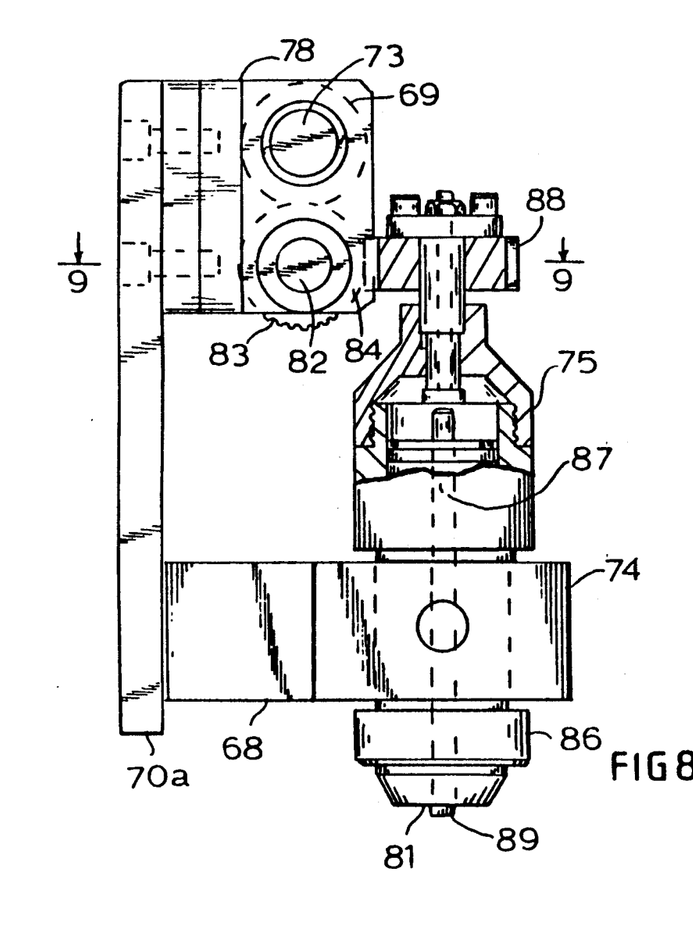
FIG. 8 is an enlarged view of a control station of FIG. 6 in partial section.
Figure 9:
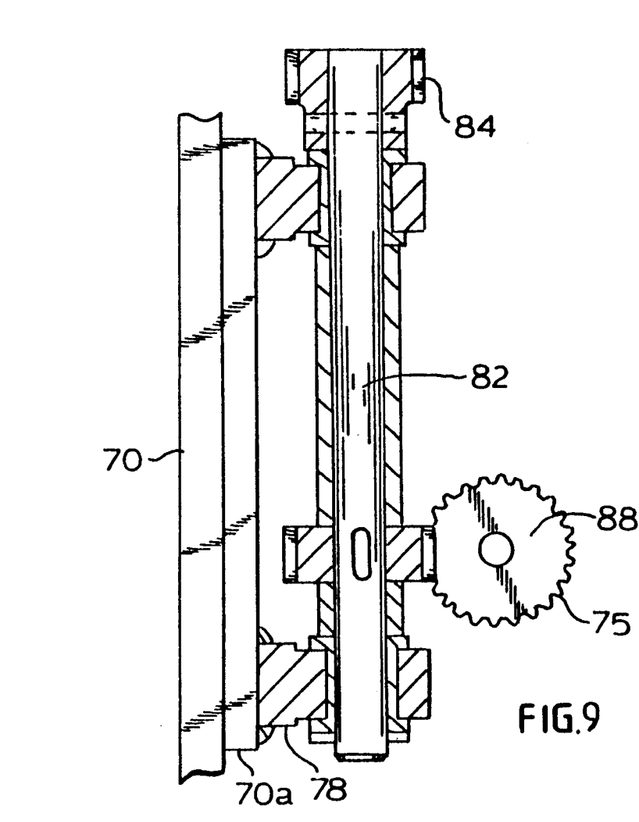
FIG. 9 is a section view taken along the line 9—9 of FIG. 8.
Figure 10:
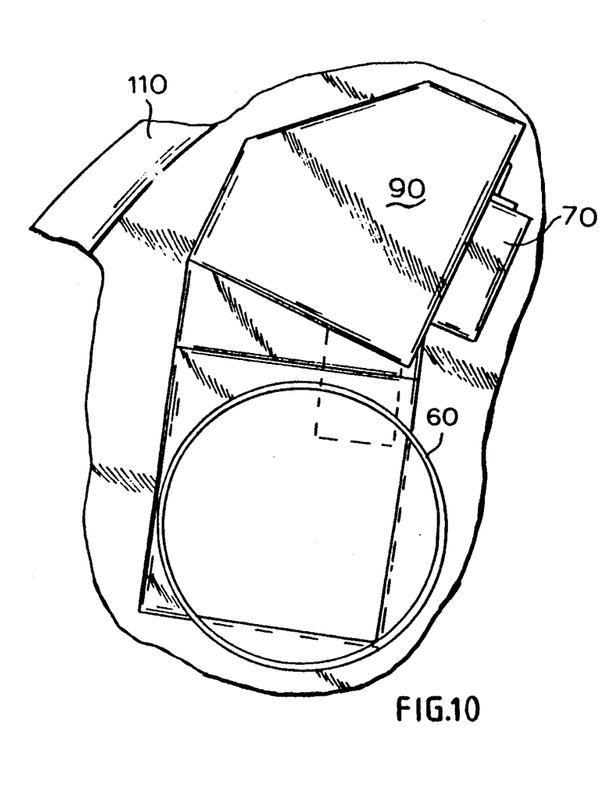
FIGS. 10, 11, 12, 13, and 14 depict a controllable drying gas delivery system in accordance with the embodiment of the present invention depicted in FIG. 4.
Figure 11:
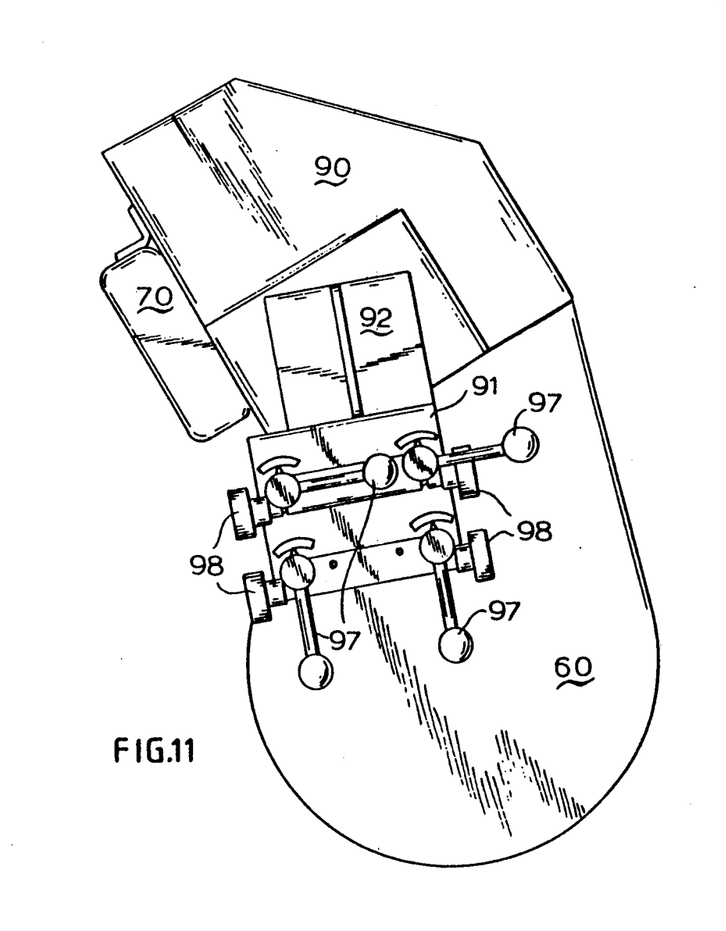
Figure 12:
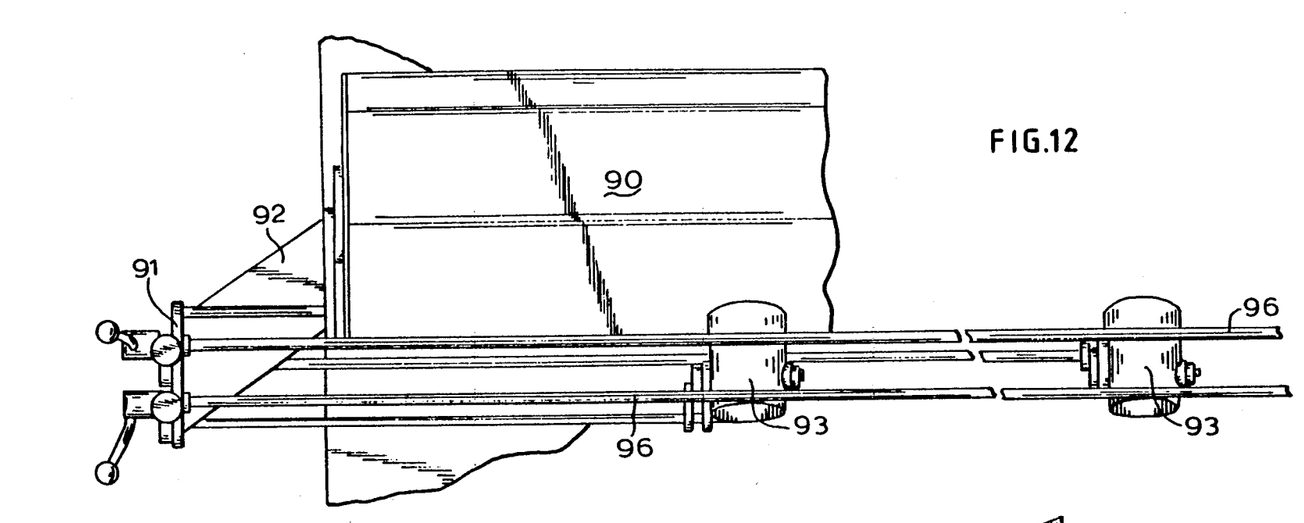
Figure 13:
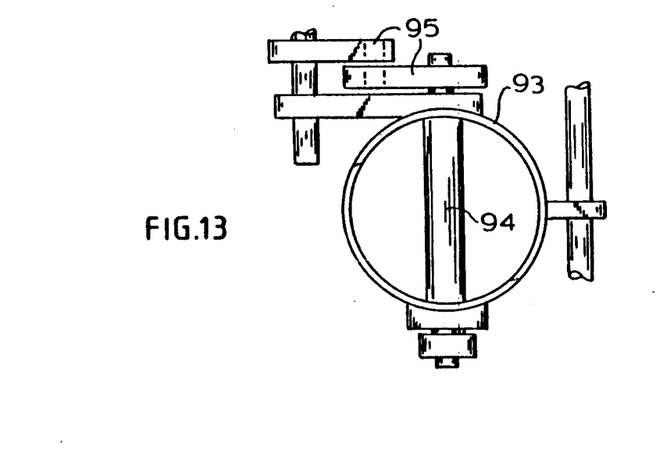
Figure 14:
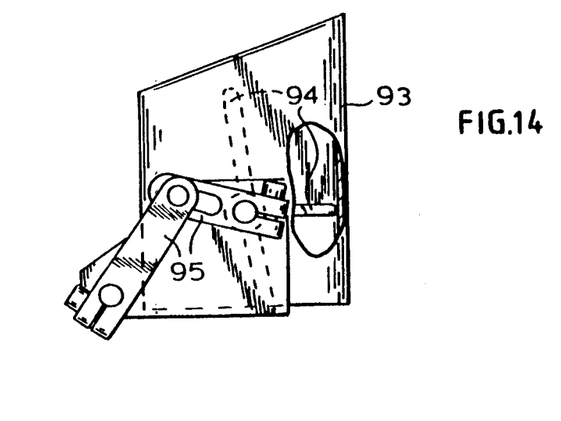

For ease of assembly, the control rod 73 can be composed of rod segments which are joined at non-interferring positions along the length thereof by any conventional joining means, such as coupling 77. The control rod 73 can be mounted to the support means 70 by bearinged mounting brackets 78 which abut directly onto the mounting means 70 or, alternatively, to adjustment control station plates 70a.

At the end of the control rod, exterior to the coating drum, there is shown (see FIG. 6) a linear control housing 76 and, in phantom, a linear control sleeve 79 surrounding the control rod on that portion of the control rod which passes through the housing 76. By use of this housing and sleeve combination in conjunction with the control pin 72 the control rod can be selectively displaced at different linear positions relative to the manifold 74 so that each of the nozzles can be individually adjusted to control the flow of coating material through the nozzles 75. This operation, which is relatively simple, includes extracting tensioned pin 72 away from the housing and out of a depressed portion of the sleeve 79 while the rod is moved in the linear direction to position each of the rotatable adjustors 69 next to a control station before the tensioned pin 72 is allowed to return to the fully set position. When the control rod is in the selected adjustment position, the rod may be rotated by means of control handle 71 which is exterior to the coating drum, preferably at the product exit end. The control rod is also provided with rotatable adjustors 69 which coact in cooperation with the nozzle adjustment stations, designated generally 80 to provide a means for selectively adjusting each of the nozzles 75.

Focusing on the control stations 80, there can be seen linking rod 82 mounted for rotation on mounting brackets 78 generally directly below the control rod 73. The linking rod 82 has a first end which is adjacent the control mechanism on the adjustable nozzle 75 having a first gear means 83, and a second end having a second gear means 84 to which rotating adjustors 69 can be engaged by linear displacement of the control rod 73 to drive the linking rod 82 and, thus, the adjustment means 88 located on the exterior of the nozzles 75.

Referring now to the adjustable nozzle 75 (see especially FIG. 8), there is depicted a nozzle having a nozzle housing 86 with a nozzle bore 87 formed therein which is in fluid communication with the coating material manifold 74. An adjustment means is provided for each of the nozzles which includes an adjustment mechanism located exterior to the nozzle, shown in FIG. 8 as an intermeshing gear means 88 connected for operation to a flow restriction pin 89 which slides linearly through the nozzle bore 87. In operation, the control rod 73 is rotated by means of handle 71 whereby a rotating adjustor 69 when engaged with a second gear means 84 of linking rod 82 is driven to turn the adjustment mechanism 88 so that the control pin 89 is raised or lowered within the bore 87, thereby controlling the flow of coating material through the nozzle orifice 81. By use of this combination adjustment means, each of the adjustment nozzles 75 can be independently adjusted to control the flow of coating material out of each station nozzle.

Turning now to the drying gas controllable supply means, reference is made to FIGS. 4 and 10–14, wherein a drying gas conduit 90 is shown on support element 70 as running the length of the interior of the coating drum. Gas drying conduit 90 includes a cylindrical portion 60 extending along a lower side of conduit 90. A control panel 91 is supported from, among other means, the conduit means by a support member 92. Drying gas exit ports 93 are located along the length of the gas conduit 90.

A baffle 94 is fixed for rotation across each of the exit ports 93 and is controlled by a linking means 95 connected to control rods 96, which, in turn, extend from and are mounted to control panel 91. Each of the control rods 96 are terminated at the control panel 91 by a control handle 97 which can be fixed in any position by screw down knobs 98. Each of the control handles or adjustment handles 97 can be rotated to turn the baffle 94 in each of the drying gas exit ports 93 to control the amount of drying gas, such as air, flowing therethrough.

Thus, as a result of the highly controllable coating delivery system and the drying gas control system, particulate matter or edible cores can be processed through the coating drum under highly controlled and manipulable conditions in order to provide the desired amount of coating on the particulate matter. Additional coats of coating material, covering material or polish, etc. can be provided in the after-treatment drums which, in the case of chocolate coatings, can include a polish spray in the first after-treatment drum 100 and a confectioner's glaze applied in the second after-treatment drum 200. A constant flow of drying gas can also be introduced into the after-treatment drum, such as from drying gas source 140 and 240, respectively. The polish spray nozzles located in the first after-treatment drum 100 are preferably controlled in order to provide a uniform thin polish over, for example, a coated confection. Similarly, with respect to the second after-treatment drum 200, highly controlled spray nozzles can be provided to provide a uniform thin coat of glaze material.

Each of the drums can also be provided with an end plate 6 in order t control the rate of product flow out of the drum, as well as the internal side scrapper to insure the tumbling effect during the coating process of the drum being rotated and for purposes of removal of excess coating material.

Furthermore, while there have been described what are presently believed to be the preferred embodiments of the invention, those skilled in the art will realize that changes and modifications may be made thereto without departing from the spirit of the invention, and it is intended to claim all such changes and modifications as fall within the true scope of the invention.

What is claimed is:

1. An apparatus useful for continuous pan coating of edible cores, comprising in combination:
   a coating drum arranged for rotation around an inclined axis and having an inlet opening at the upper axial end of said inclined coating drum for reception of said edible cores, a discharge opening at the lower axial end of said drum, whereby the force of gravity urges said cores through said drum during pan coating operation;
   means for continuously driving said drum;
   means for providing coating material to said cores at a controllable rate, said means for providing coating material comprising a coating manifold extending lengthwise through the interior of said coating drum and provided with adjustable coating nozzles along the length thereof for selectively controlling the rate that coating material is delivered to said cores, and a control means for selectively adjusting each of said nozzles from a location exterior said coating drum to vary the quantity of coating material ejected from each of said nozzles per unit of time, each of said adjustable coating nozzles comprising a nozzle housing having a coating supply bore with an exit port, a movable means for restricting fluid flow through said exit port responsive to means for adjusting said flow restriction means, said adjustment means fixed to said nozzle housing at a location exterior thereto and operable to adjust said flow restriction means;
   means for simultaneously delivering drying gas to said cores at a controllable rate during passage of said cores through said drum;
   at least one after-treatment drum likewise arranged for rotation around an inclined axis and having an inlet opening at the upper axial end of said inclined after-treatment drum for the reception of said coated cores from said coating drum, a discharge opening for the discharge of treated coated cores and means for continuously driving said at least one after-treatment drum;

means for continuously conveying said coated cores from said discharge end of said coating drum to said inlet opening of said after-treatment drum; and means for continuously providing after-treatment coating to said coated cores at a controllable rate during the passage of said cores through said after-treatment drum.

2. The apparatus of claim 1 wherein said drums further comprise means for controlling the degree of incline of said axis whereby the rate of passing cores through said drum is effected.

3. The apparatus as defined in claim 1 which further comprises a second after-treatment drum arranged for rotation around an inclined axis, and having an inlet opening at the upper axial end of said second after-treatment drum for reception of coated cores from said first after-treatment drum and a discharge opening for the discharge of twice after-treated cores;

means for continuously driving said second after-treatment drum;

means for continuously conveying said first after-treatment coated cores from said discharge end of said first after-treatment drum;

means for providing second after-treatment coating at a controllable rate to said once after-treated coated cores during the passage of said cores through said second after-treatment drum; and means for simultaneously delivering drying gas to said cores at a controllable rate during passage of said cores through said second after-treatment drum.

4. The apparatus as defined in claim 1, wherein said manifold is a continuous conduit connected for fluid communication with a source of coating material and with each of said adjustable nozzles whereby fluid coating material is provided to said nozzles.

5. The apparatus as defined in claim 1, wherein said movable means for restricting flow is a pin element slidably mounted in said bore and connected to said adjusting means for linear movement within said bore to adjust the opening for fluid flow through said exit port.

6. The apparatus as defined in claim 1, wherein said control means comprises nozzle adjustment stations mounted interiorly of said coating drum at positions adjacent said coating manifold nozzles, a rod member secured for rotation parallel to said coating manifold and having fixed thereon rotating adjustors for cooperative action with said nozzle adjustment stations at positions on said rod member in which each said rotating adjustor can be selectively engaged with and disengaged from its respective nozzle adjustment station by linear movement of said rod member, means for varying the position of said rod member linearly with respect to said coating manifold, and means for rotating said rod member fixed on one end thereof which is exterior to said coating drum.

7. The apparatus as defined in claim 6, wherein each said nozzle adjustment stations comprises means for securing said rod member for rotation and an interconnecting drive means fixed to said means for securing said rod for driving said manifold nozzle adjustment means in response to rotation of said rotating adjustor.

8. The apparatus as defined in claim 7, wherein said interconnecting drive means comprises a drive rod having a first end adjacent said nozzle adjustment means with a first driving gear means fixed thereon for driving said nozzle adjustment means, and having a second end with a second driving gear means fixed thereon proximal said rotating adjustor which is selectively engaged by said rotating adjustor by linear displacement of said rod member whereby said interconnecting drive means and said nozzle adjustment means is driven upon rotation of said rod member while said rotating adjustor and said second gear means are engaged.

9. The apparatus as defined in claim 8, wherein said means for varying the linear position of said rod member comprises a linear-shift housing mounted at the end of said rod member exterior said coating drum through which said rod member extends, a linear rod control sleeve fixed around said rod at a position on said rod which extends through said housing, said control sleeve having adjusting elements formed thereon which coact with said linear shift housing to secure said rod member in positions such that each said rotating adjustor will engage a respective second gear means in each said positions.

10. The apparatus as defined in claim 1, wherein said means for delivering drying gas at a controllable rate comprises a drying gas manifold mounted lengthwise along the interior of said coating drum, said manifold having adjustable gas delivery ports provided along the length thereof and means for controlling the flow of drying gas through each said delivery ports from a location exterior said coating drum.

11. The apparatus as defined in claim 10, wherein each said drying gas delivery port comprises an exit orifice having a baffle mounted therein for rotation across said exit orifice and said means for controlling the flow of said drying gas comprises linking means extending from a control handle exterior of said coating drum to said baffle for rotating said baffle whereby the opening for fluid flow through each said exit orifice is controlled.

12. An apparatus useful for continuous pan coating of edible cores, comprising in combination:

a coating drum arranged for rotation around an inclined axis and having an inlet opening at the upper axial end of said inclined coating drum for reception of said edible cores, a discharge opening at the lower axial end of said drum, whereby the force of gravity urges said cores through said drum during pan coating operation;

means for continuously driving said drum;

means for providing coating material to said cores at a controllable rate;

means for simultaneously delivering drying gas to said cores at a controllable rate during passage of said cores through said drum, said means for delivering drying gas at a controllable rate comprising a drying gas manifold mounted lengthwise along the interior of said coating drum, said manifold having adjustable gas delivering ports provided along the length thereof and means for controlling the flow of drying gas through each said delivery ports from a location exterior said coating drum;

at least one after-treatment drum likewise arranged for rotation around an inclined axis and having an inlet opening at the upper axial end of said inclined after-treatment drum for the reception of said coated cores from said coating drum, a discharge opening for the discharge of treated coated cores, and means for continuously driving said at least one after-treatment drum;

means for continuously conveying said coated cores from said discharge end of said coating drum to said inlet opening of said after-treatment drum; and means for continuously providing after-treatment coating to said coated cores at a controllable rate during the passage of said cores through said after-treatment drum.

13. The apparatus of claim 12 wherein said drums further comprise means for controlling the degree of incline of said axis whereby the rate of passing cores through said drum is effected.

14. The apparatus as defined in claim 12 which further comprises a second after-treatment drum arranged for rotation around an inclined axis, and having an inlet opening at the upper axial end of said second after-treatment drum for reception of coated cores from said first after-treatment drum and a discharge opening for the discharge of twice after-treated cores;

means for continuously driving said second after-treatment drum;

means for continuously conveying said first after-treatment coated cores from said discharge end of said first after-treatment drum;

means for providing second after-treatment coating at a controllable rate to said once after-treated coated cores during the passage of said cores through said second after-treatment drum; and means for simultaneously delivering drying gas to said cores at a controllable rate during passage of said cores through said second after-treatment drum.

15. The apparatus as defined in claim 12, wherein each said drying gas delivery port comprises an exit orifice having a baffle mounted therein for rotation across said exit orifice and said means for controlling the flow of said drying gas comprises linking means extending from a control handle exterior of said coating drum to said baffle for rotating said baffle whereby the opening for fluid flow through each said exit orifice is controlled.

* * * * *